United States Patent
Taylor et al.

(10) Patent No.: US 10,614,472 B1
(45) Date of Patent: Apr. 7, 2020

(54) METHOD AND SYSTEM FOR MANAGING, ACCESSING AND ANALYZING DATA FROM MULTIPLE CROSS-FUNCTIONAL SOURCES

(71) Applicant: EMC Corporation, Hopkinton, MA (US)

(72) Inventors: Andrea T. Taylor, Iowa City, IA (US); Kevin J. Kyle, Westford, MA (US); Steven M. Roberts, North Chelmsford, MA (US); Dipankar Roychowdhury, Billerica, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 211 days.

(21) Appl. No.: 14/109,381

(22) Filed: Dec. 17, 2013

(51) Int. Cl.
*G06Q 30/02* (2012.01)

(52) U.S. Cl.
CPC .................. *G06Q 30/0203* (2013.01)

(58) Field of Classification Search
USPC ........................................ 705/7.32
See application file for complete search history.

(56) References Cited

U.S. PATENT DOCUMENTS

| | | | |
|---|---|---|---|
| 6,807,518 B1 | 10/2004 | Lang | |
| 8,041,592 B2 | 10/2011 | Lopez | |
| 8,392,360 B1* | 3/2013 | Dicker | G06Q 10/10 707/608 |
| 8,396,741 B2* | 3/2013 | Kannan | G06Q 10/06398 379/265.06 |
| 8,892,539 B2* | 11/2014 | Anand | G06F 17/30654 707/705 |
| 2009/0292687 A1* | 11/2009 | Fan | G06F 17/30654 |
| 2010/0169148 A1* | 7/2010 | Oberhofer | G06Q 10/06 705/7.13 |
| 2011/0029480 A1 | 2/2011 | DeLucia | |
| 2011/0295722 A1* | 12/2011 | Reisman | G06Q 30/0201 705/27.1 |
| 2012/0005218 A1* | 1/2012 | Rajagopal | G06F 17/30654 707/749 |
| 2012/0047219 A1 | 2/2012 | Feng et al. | |
| 2012/0331390 A1* | 12/2012 | Kanjirathinkal | G06Q 50/01 715/738 |
| 2013/0035986 A1 | 2/2013 | Kursar et al. | |

(Continued)

FOREIGN PATENT DOCUMENTS

WO  2005027001 A2  3/2005

OTHER PUBLICATIONS

App orchid wins tender by danish energinet.dk, the national transmission system operator for an artificial intelligence powered grid analytics project. (Jan. 14, 2017). ICT Monitor Worldwide Retrieved from http://dialog.proquest.com/professional/docview/1858305719?accountid=131444 (Year: 2017).*

*Primary Examiner* — Folashade Anderson
(74) *Attorney, Agent, or Firm* — Ryan, Mason & Lewis, LLP

(57) ABSTRACT

Experience data corresponding to offerings of an enterprise is collected from a plurality of data sources in a single data resource. A query of the experience data is received and run on a big data analytics system to determine one or more consumer issues from the experience data. The one or more consumer issues are identified to a user in results of the query.

20 Claims, 3 Drawing Sheets

(56) References Cited

U.S. PATENT DOCUMENTS

| | | | |
|---|---|---|---|
| 2013/0110775 A1* | 5/2013 | Forsythe | G06F 17/30943 |
| | | | 707/613 |
| 2013/0198120 A1 | 8/2013 | Vezina | |
| 2013/0282417 A1* | 10/2013 | Gaedcke | G06Q 30/016 |
| | | | 705/7.13 |
| 2014/0200989 A1* | 7/2014 | Cohen Kassko | G06Q 30/0243 |
| | | | 705/14.42 |
| 2015/0149497 A1* | 5/2015 | Kanjirathinkal | G06F 16/3338 |
| | | | 707/765 |
| 2016/0274961 A1* | 9/2016 | Thomas | G06F 11/0709 |
| 2019/0294487 A1* | 9/2019 | Thomas | G06F 11/0793 |

* cited by examiner

METHOD AND SYSTEM FOR MANAGING, ACCESSING AND ANALYZING DATA FROM MULTIPLE CROSS-FUNCTIONAL SOURCES

FIELD

The field relates to information processing, and more particularly to information processing techniques for managing, accessing and analyzing data from multiple cross-functional sources.

BACKGROUND

Organizations typically have a limited amount of resources to spend on customer and employee training and prefer that the resources be efficiently applied. For example, organizations generally want to design training courses that will help their customers more effectively use the organization's products or services, and help their employees be more productive, so that the organization can maximize its profits.

Feedback provided for training courses may state, for example, that the courses are too basic and are not up to date, and that examples are too simple or not tied to real-world scenarios. Required course content is often determined differently for different projects and different business units, making it difficult for course developers to assess whether their course will interest and/or help customers, or whether an employer will be willing to fund the course. If appropriate content is not provided for training courses, customers are likely to spend their money elsewhere.

When determining appropriateness of training course content, course developers access and analyze data from many different sources. Accordingly, there is a need for improved techniques of accessing and analyzing data so that course developers can be sure that the time they spend developing and updating courses is being spent wisely.

SUMMARY

Embodiments of the present invention provide information processing techniques for managing, accessing and analyzing data from multiple cross-functional sources.

For example, in one embodiment, a method comprises the following steps. Experience data corresponding to offerings of an enterprise is collected from a plurality of data sources in a single data resource. A query of the experience data is received and run on a big data analytics system to determine one or more consumer issues from the experience data. The one or more consumer issues are identified to a user in results of the query.

In another embodiment, an article of manufacture is provided which comprises a processor-readable storage medium having encoded therein executable code of one or more software programs. The one or more software programs when executed by at least one processing device implement steps of the above-described method.

In yet another embodiment, an apparatus comprises a memory and a processor operatively coupled to the memory and configured to perform steps of the above-described method.

Advantageously, illustrative embodiments of the invention create a single data resource by collecting and managing structured and unstructured data from various cross-functional sources including, but not limited to, sales, customer support, surveys, beta programs and social media websites, such as, for example, Facebook®, Twitter® and LinkedIn®.

The data can also include customer click counts from organizational websites, such as, for example, organizational training websites. Other data sources can include, for example, data from partners, engineering, product management, professional services, and internet search engine analytics. The data can be analyzed to discover pain points, for example, customer and/or employee pain points, by product/service line, feature and other such criteria. This analysis can be leveraged to create or update targeted items, such as, for example, training courses and/or products, to make the training and/or products more effective and customer driven.

These and other features and advantages of the present invention will become more readily apparent from the accompanying drawings and the following detailed description.

DETAILED DESCRIPTION

Figure 1:
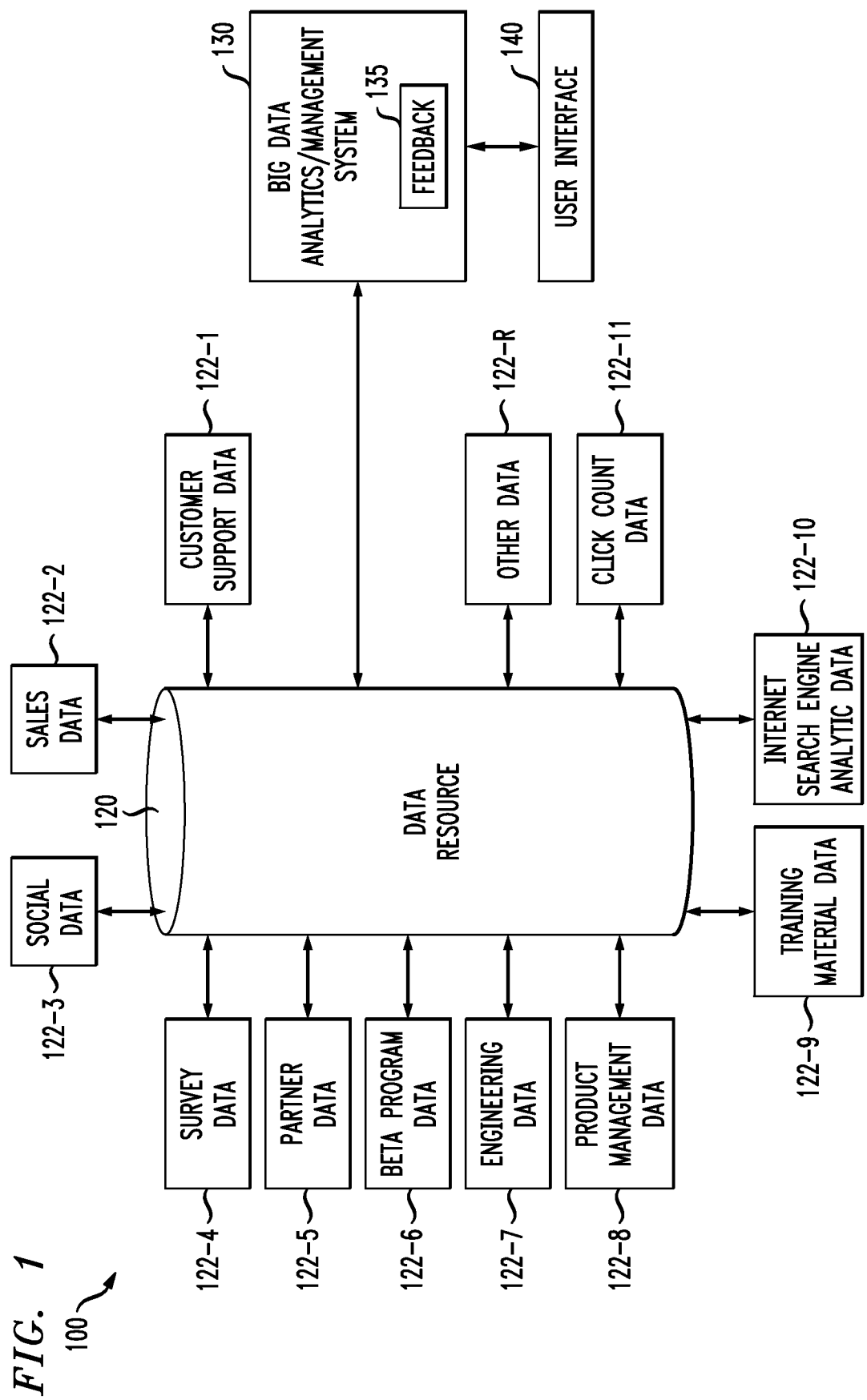
FIG. 1 shows a data analytics and management system environment, in accordance with one embodiment of the invention.

Embodiments of the present invention will be described herein with reference to exemplary information processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "information processing system," "computing system" and "data storage system" as used herein are intended to be broadly construed, so as to encompass, for example, private or public cloud computing or storage systems, as well as other types of systems comprising distributed virtual and/or physical infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

As used herein, the term "enterprise" refers to a business, company, firm, venture, organization, operation, concern, corporation, establishment, partnership, a group of one or more persons, or some combination thereof.

Embodiments of the present invention create a single data resource, by collecting and managing structured and unstructured data from various cross functional sources. For example, groups within an organization are surrounded by data, but may only have access to and/or consider data from some of the sources when making organizational decisions. Accordingly, embodiments of the present invention provide information processing techniques for managing, accessing and analyzing data from multiple cross-functional sources. For example, in the case of education services, which provides training to customers and/or employees in connection with products and services of an enterprise, product groups may tell education services what to include in course material, but other data sources, including but not limited to sales, customer support, survey results, social media, and other functions also have relevant and useful data. Accordingly, in order to optimize the effectiveness of current training courses, embodiments of the present invention permit course development to not only be based on one or two sources, such as engineering input, but to also be based on other multiple sources, such as direct, holistic customer data, including top questions and issues that come into customer support and customer conversations on social media channels. It is to be understood that although used as an exemplary embodiment herein, embodiments of the present invention are not limited to use in connection with the design of training courses, and may also be applied to other areas outside of education services, including but not limited to product management (e.g., design of products and product features), technical writings (e.g., manuals, product literature) and technical publications (e.g., knowledge-based customer support articles).

FIG. 1 shows a data analytics and management system environment, in accordance with one embodiment of the invention. As shown in system environment 100, a user interface 140 is operatively coupled to a data resource 120 via a big data analytics and management system 130, which is operatively coupled to the data resource 120. In accordance with an embodiment, the big data analytics and management system 130 includes a feedback module 135.

The analysis of massive amounts of data is an activity performed in many commercial and academic organizations. Analyzing these data sets may require processing tens or hundreds of terabytes of data. Such large data sets have become known as "big data." A data set characterized as big data may be so large such that, for example, it is beyond the capabilities of commonly used software tools to manage/process the data, or at least to do so within a reasonable time frame.

The data that comprises the data resource (considered in illustrative embodiments to be big data due to the size of the data stored) includes both structured data (e.g., existing data within various functions of an enterprise, such as, support sales, etc.) and unstructured data (e.g., data from social media sources) from many, varied cross-functional data sources. More specifically, structured data can include data that is resident in fixed fields within records or files, such as data in relational databases and spreadsheets. Structured data can include types of business data that are recorded, stored, processed and accessed in accordance with a particular data model. Data that resides in a fixed field within a record or file is called structured data. This includes data contained in relational databases and spreadsheets. Unstructured data can refer to data that does not reside in fields in a database. Unstructured data can include text and multimedia content, such as, for example, e-mail messages, word processing documents, videos, photos, audio files, presentations, webpages and other kinds of data that do not reside in relational databases and spreadsheets.

As shown, by way of example only, such data may include customer support data 122-1 (data associated with customer issues, including concerns and/or requests for assistance classified and responded to by the enterprise), sales data 122-2 (data associated with sales of products and services offered by the enterprise including, for example, revenue, volume, profit, notes from conferences/trade shows), social data 122-3 (data related to the enterprise and its offerings (e.g., products and services) retrieved from external social media outlets, such as, for example, Facebook®, Twitter® and LinkedIn®), survey data 122-4 (data from surveys responded to by customers and/or employees in connection with the offerings of the enterprise), partner/reseller and professional service data 122-5 (data from other enterprises that work and/or contract with the enterprise), beta program data 122-6 (data including feedback regarding test programs in connection with enterprise offerings), engineering data 122-7 (data from engineers and technical personnel within an enterprise concerning issues, including successes and/or trouble areas with products and services), product management data 122-8 (data from non-technical personnel within an enterprise concerning issues, including successes and/or trouble areas with products and services), training material data 122-9 (data concerning training materials offered in connection with products and services), internet search engine analytic data 122-10 (data derived from internet searches in connection with the offerings of the enterprise), click count data 122-11 (data concerning customer and/or employee click counts from organizational websites, such as, for example, organizational training websites) and other data 122-R (which can represent one or more other types of data that can be stored as part of the data resource 120). It is to be appreciated that the data stored in resource 120 could be data associated with one or more purposes.

In accordance with an embodiment of the present invention, the data resource 120 connects employees with both structured experience data (e.g., existing data within various functions of an enterprise, such as, support sales, etc.) and unstructured experience data (e.g., data from social media sources), so that employees can make informed and effective business decisions concerning products and/or services of an enterprise. More specifically, the experience data can include consumer experience data corresponding to the offerings (e.g., products and services) of an enterprise, including the consumers' issues, such as reactions, questions, comments, problems, likes, dislikes, pain points, etc., in connection with the offerings.

The big data analytics and management system 130 uses big data analytics to mine both the structured and unstructured data in the data resource 120. In accordance with an embodiment, based on results from queries executed on the big data analytics and management system 130 by a user through user interface 140, a user, such as, for example, an employee of the enterprise, can identify the most relevant issues surrounding the products and/or services of the enterprise. For example, according to an embodiment in an education services scenario, a training course developer can identify the most important and/or relevant content to include in training courses. With this relevant course content, education services can market training as being based on real-world data and containing up-to-date and relevant content. Embodiments of the present invention can be applied in other areas to determine, for example, the most relevant and current product features, publications and technical writings. The embodiments of the present invention are also capable of being scaled to correspond to the available processes and technologies.

In applying an embodiment of the present invention, a user charged with a task in an enterprise (e.g., to create a new training course, update a product or publication, etc.) logs on to the data resource 120 via the user interface 140, enters terms relevant to his/her task (e.g., keywords and/or parameters related to a product, training course, target audience, etc.) and is able to view a summary of how the target audience is receiving a particular concept. For example, an employee may form a query to see customer feedback about particular products, services, training courses, publications, writings, etc., what the customers are calling into customer support about, the areas of a product or service causing customers to struggle and/or what offerings are selling or not selling.

The big data analytics and management system 130 runs the user query and identifies issues based on, for example, frequency and severity of terms and/or topics. In accordance with an embodiment of the present invention, query results are based on both structured and unstructured data, indicating that system administrators have opened many cases with customer support concerning a particular issue (e.g., an initial configuration of related products), and that numerous customers are commenting on the issue via social media. The big data analytics and management system 130 is capable of analyzing data from all of the possible data sources in the data resource 120 and, in response to a user query, identifying to a user the points requiring the most attention (e.g., customer pain/problem points). As a result an employee developer can efficiently formulate a relevant and impactful response to improve a product or service by solving a real and current problem (e.g., develop a practical and detailed initial configuration section in an instruction manual or training course). Referring to the example, because of the development of the detailed initial configuration section, users of the enterprise product can be prepared to efficiently configure a product at their organizations, and customer support will likely notice a lower call volume for initial configuration of a new product.

In accordance with an embodiment of the present invention, once a user develops a solution to an identified problem, a user can provide information or a notification via the user interface 140 back to the big data analytics and management system 130 regarding the problem that was addressed and the developed solution. A feedback module 135, which can be part of the big data analytics and management system 130 matches the addressed problem and solution with corresponding data from the data resource and transmits information or messages detailing the addressed problem and solution back to the data sources so that customers can receive feedback that their concerns were addressed and receive details about the solution. In accordance with an embodiment, matching the addressed problem and solution with corresponding data from the data resource includes, for example, determining frequency and severity of terms and/or topics that are the same or similar to the addressed problem and solution. For example, a customer may identify a particular issue with a product or service on a social media outlet, and once the problem is addressed by the enterprise, the customer can receive feedback via the social media outlet that the enterprise listened to their concerns and addressed the problem. The big data analytics and management system 130 is capable of picking up the customer comments on the issue and determining that the solution corresponds to the comments so as to provide feedback to relevant parties and locations.

The query and feedback results are obtained from big data analysis by the big data analytics and management system 130. The big data analytics and management system 130 provides administrators, developers and other users via a user interface 140 with the ability to analyze, as well as manage, all or portions of the data stored in resource 120. Data analytics and management functions may include, but are not limited to, data mining, data inspection, data transformation and/or data modeling. Performance of such functions allows the administrators, developers and other users to discover useful information, assist in or perform decision making and/or draw conclusions.

In accordance with an embodiment of the present invention, a diverse array of Massively Distributed Computing Platforms (MDCP) running on large clusters of commodity machines (nodes) can be used to perform the big data analysis tasks. Examples of such platforms include MapReduce from Google® and its open-source implementation Hadoop®, Dryad from Microsoft®, MPP Database from Greenplum® and Spark from University of California at Berkley AMPLab.

A node cluster where a MDCP resides may represent a set of resource elements, such as a central processing unit (CPU), memory, disk and network, which fuel the application programs running in the MDCP. Conceptually, a MDCP application includes one or multiple jobs, which in turn are composed of short tasks. Each task is typically executed at a dedicated node.

In accordance with an embodiment of the present invention, the big data analytics and management system 130 includes customizable functionality that allows enterprises to weight the data 122-1 through 122-R from the multiple sources however it makes sense for their organization. For example, in an embodiment, an enterprise gives all data sources equal weight, and the big data analytics and management system 130 searches for the most commonly used words from all data sources and gives higher priority to the data with those words. In another embodiment, an enterprise assigns different weights to some or all of data sources. For example, customer support data 122-1 and/or beta program data 122-6 can be worth 2-3 times that of social data 122-3. In a different weighting configuration, a query can focus on commonly used words, but will assign priority according to the determined weights. For example, the same or similar frequency of words from two or more data sources can be assigned different priorities corresponding to assigned weights, so that higher weighted data is given a higher priority than lower weighted data even though the data sources yielded the same frequency of commonly used words.

Although the components 120, 130 and 140 are shown as separate in FIG. 1, these components or portions thereof may be implemented at least in part on a common processing platform. In other embodiments, components 120, 130 and 140 may each be implemented on a separate processing platform. It is also to be understood that a given embodiment may include multiple instances of the components 120, 130 and 140, although only single instances of such components are shown in the system diagram for clarity and simplicity of illustration.

Figure 2:
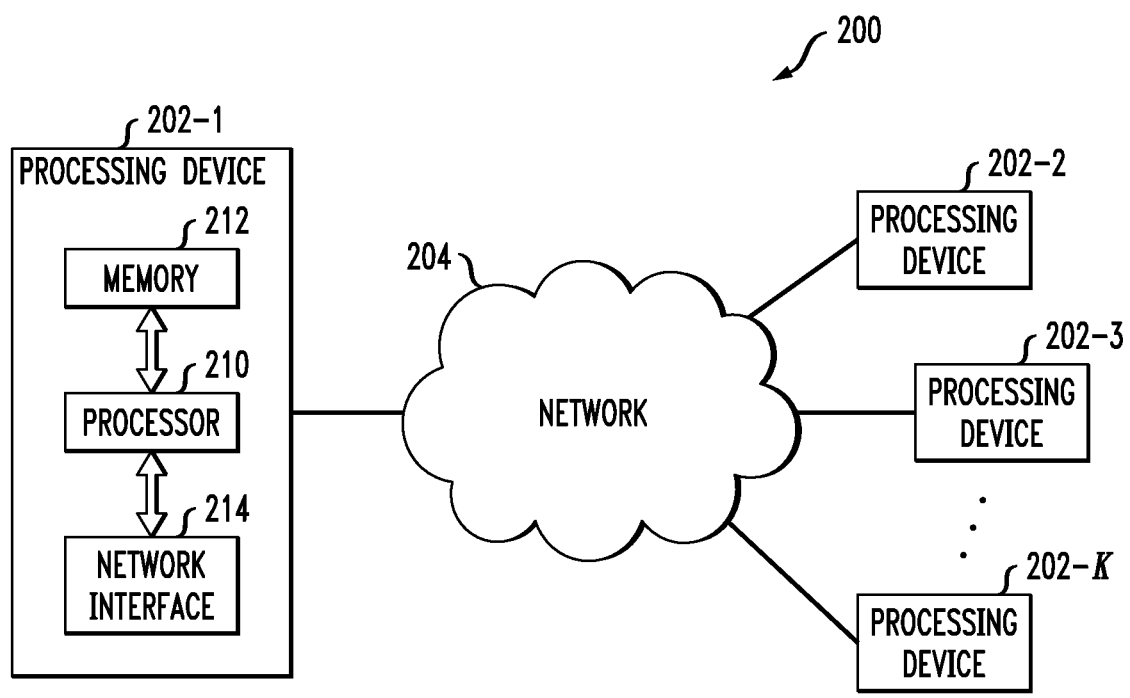
FIG. 2 shows a distributed processing platform on which the data analytics and management system of FIG. 1 is implemented, in accordance with one embodiment of the invention.

An example of a processing platform on which the system environment 100 of FIG. 1 may be implemented is information processing platform 200 shown in FIG. 2. The processing platform 200 in this embodiment comprises a plurality of processing devices, denoted 202-1, 202-2, 202-3, . . . 202-K, which communicate with one another over a network 204. One or more of the data sources 122-1 through 122-R, the data resource 120, the big data analytics and management system 130, and the user interface 140 may each run on a server, computer or other processing platform element, which may be viewed as an example of what is more generally referred to herein as a "processing device." Note that one or more processing devices in FIG. 2 may be servers, while one or more processing devices may be client devices. As illustrated in FIG. 2, such a device generally comprises at least one processor and an associated memory, and implements one or more functional modules for controlling features of the system environment 100. Again, multiple elements or modules may be implemented by a single processing device in a given embodiment.

The processing device 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements.

Components of a computing system as disclosed herein can be implemented at least in part in the form of one or more software programs stored in memory and executed by a processor of a processing device such as processor 210. Memory 212 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 212 may comprise electronic memory such as random access memory (RAM), read-only memory (ROM) or other types of memory, in any combination. The one or more software programs when executed by a processing device such as the processing device 202-1 causes the device to perform functions associated with one or more of the elements/components of system environment 100. One skilled in the art would be readily able to implement such software given the teachings provided herein. Other examples of processor-readable storage media embodying embodiments of the invention may include, for example, optical or magnetic disks.

Processing device 202-1 also includes network interface circuitry 214, which is used to interface the device with the network 204 and other system components. Such circuitry may comprise conventional transceivers of a type well known in the art.

The other processing devices 202 of the processing platform 200 are assumed to be configured in a manner similar to that shown for computing device 202-1 in the figure.

The processing platform 200 shown in FIG. 2 may comprise additional known components such as batch processing systems, parallel processing systems, physical machines, virtual machines, virtual switches, storage volumes, etc. Again, the particular processing platform shown in the figure is presented by way of example only, and system 200 may include additional or alternative processing platforms, as well as numerous distinct processing platforms in any combination.

Also, numerous other arrangements of servers, clients, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

Furthermore, it is to be appreciated that the processing platform 200 of FIG. 2 can comprise virtual machines (VMs) implemented using a hypervisor. A hypervisor is an example of what is more generally referred to herein as "virtualization infrastructure." The hypervisor runs on physical infrastructure. As such, the data analytics and management techniques illustratively described herein can be provided in accordance with one or more cloud services. The cloud services thus run on respective ones of the virtual machines under the control of the hypervisor. Processing platform 200 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 200 in one or more embodiments of the invention is the VMware vSphere® (VMware Inc. of Palo Alto, Calif.) which may have an associated virtual infrastructure management system such as the VMware vCenter™. The underlying physical infrastructure may comprise one or more distributed processing platforms that include storage products such as VNX® and Symmetrix VMAX®, both commercially available from EMC Corporation of Hopkinton, Mass. A variety of other computing and storage products may be utilized to implement the one or more cloud services that provide the data analytics and management functionality and features described herein.

Figure 3:
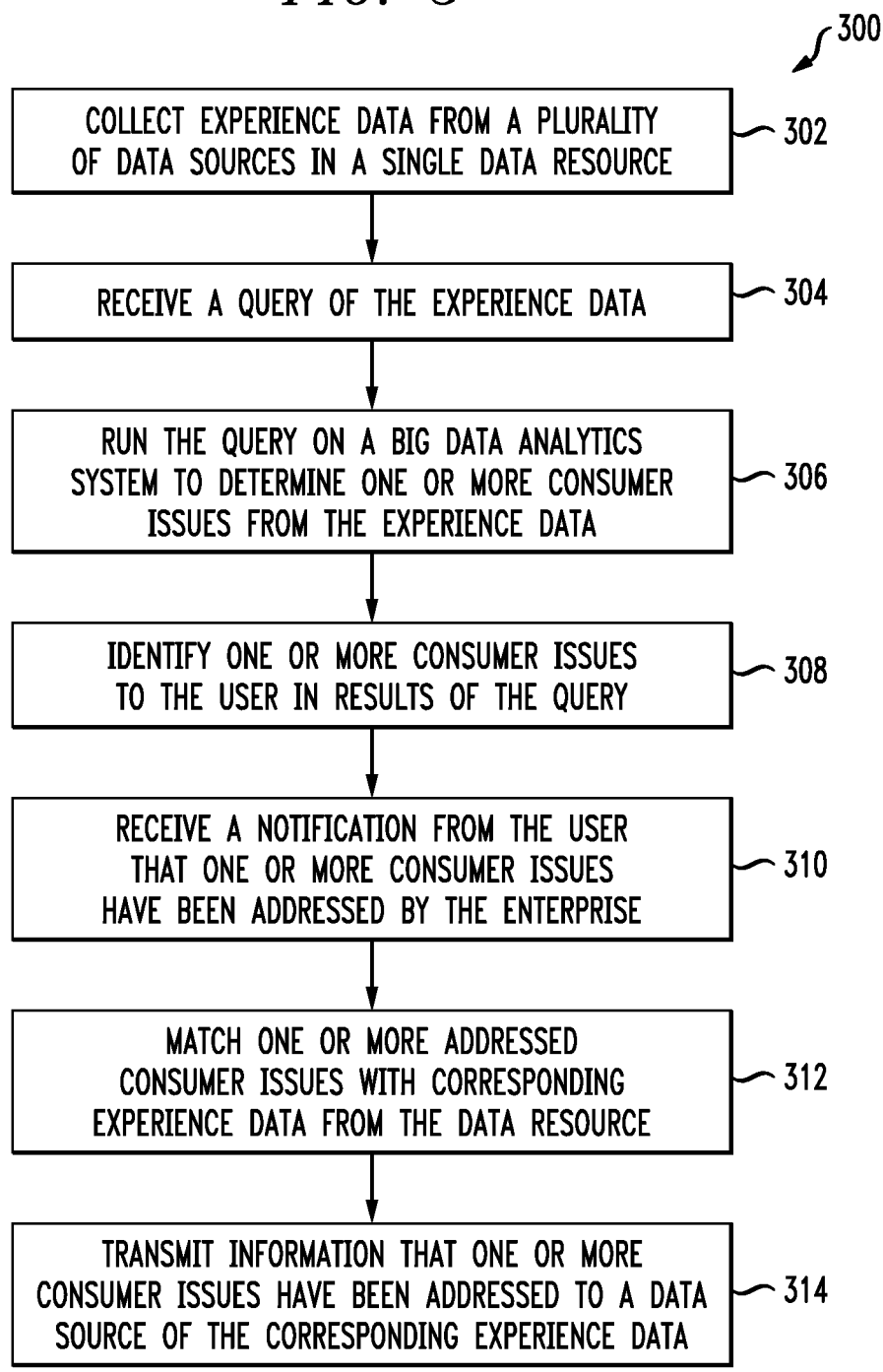
FIG. 3 shows a methodology for managing, accessing and analyzing data from multiple cross-functional sources, in accordance with one embodiment of the invention.

FIG. 3 shows a methodology 300 for managing, accessing and analyzing data from multiple cross-functional sources, in accordance with one embodiment of the invention. It is assumed the methodology 300 is performed in accordance with the system 100 in FIG. 1.

In step 302, experience data corresponding to offerings (e.g., products and services) of an enterprise is collected from a plurality of data sources in a single data resource. In accordance with an embodiment of the present invention, the experience data includes structured and unstructured data, such as, for example, customer support data and social media data, survey data and beta program data, and click count data from a website of the enterprise. In step 304, a query of the experience data is received. The query can be received from a user via a user interface. In step 306, the query is run on a big data analytics system to determine one or more consumer issues from the experience data, and in step 308, the one or more consumer issues are identified to the user in results of the query via the user interface. Big data analytics may be used to mine both structured and unstructured data in the data resource.

In accordance with an embodiment of the present invention, the one or more consumer issues are identified by at least one of a product line, a service line, a product feature or a service feature, and correspond to at least one education course offered by the enterprise. The issues may comprise at least one of questions, problems, dislikes or pain points in connection with the offerings of the enterprise.

In a further step 310, a notification is received from the user that the one or more consumer issues have been addressed by the enterprise (e.g., improving a product or service). In accordance with an embodiment, the notification can be received via the user interface 140 by the big data analytics and management system 130, and more particularly, at the feedback module 135. Then, in step 312, a big data analytics system matches the one or more addressed consumer issues with corresponding experience data from the data resource, and in step 314, information that the one or more consumer issues have been addressed is transmitted to a data source of the corresponding experience data.

Embodiments of the present invention effectively leverage large amounts of structured and unstructured data from multiple sources. Implementation of the embodiments of the present invention enables processing and analysis of vast amounts of big data to optimize enterprise products and services, improving quality, reducing customer support calls, increasing revenue, and resulting in more loyal and happy customers. By organizing both structured and unstructured data from multiple sources in a single resource tied to a big data analytics and management system, embodiments of the present invention permit parallel processing and analysis of archived and real-time or close to real-time data to respond to user inquiries for developing products and services.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A system comprising:
a distributed computing platform comprising a plurality of node clusters, a given one of the plurality of node clusters comprising a given set of resource elements dedicated for performance of a given task in the distributed computing platform;
the distributed computing platform being configured:
to receive, via a user interface from a user computing device, a query associated with an enterprise system;
to run the query, utilizing structured data and unstructured data of a big data resource, to identify at least one issue associated with the enterprise system, the big data resource comprising data from a plurality of data sources coupled to the big data resource via at least one network;
to provide, via the user interface to the user computing device, the identified issue;
to receive, via the user interface from the user computing device, feedback regarding the identified issue and a resolution to the identified issue;
to match at least one of one or more terms and one or more topics in the identified issue and the resolution to the identified issue with a portion of the data in the big data resource received from a subset of the plurality of data sources; and
to initiate action in the subset of the plurality of data sources to resolve the identified issue;
wherein the user computing device is not configured with computing resources sufficient to run the query on an amount of data stored in the big data resource within a designated time period, and wherein the plurality of node clusters of the distributed computing platform have sufficient computing resources to run the query on the amount of data stored in the big data resource within the designated time period.

2. The system of claim 1 wherein the given set of resource elements of the given node cluster comprises central processing unit resources, memory resources, disk resources and network resources.

3. The system of claim 1 wherein the plurality of node clusters comprises a first node cluster comprising a first type of commodity machines and at least a second node cluster comprising a second type of commodity machines.

4. The system of claim 1 wherein the distributed computing platform is configured to run the query, in parallel utilizing two or more of the plurality of node clusters, on archived and real-time data of the plurality of data sources that is stored in the big data resource.

5. The system of claim 1 wherein the plurality of data sources comprises one or more social media data sources, and wherein matching said at least one of the one or more terms and the one or more topics in the identified issue and the resolution to the identified issue with the portion of the data in the big data resource received from a subset of the plurality of data sources comprises identifying one or more users of the enterprise system posting comments to the one or more social media data sources indicating that the one or more users are affected by the identified issue.

6. The system of claim 5 wherein initiating the action in the subset of the plurality of data sources to resolve the identified issue comprises generating notifications via the one or more social media data sources to the one or more users of the enterprise system indicating the resolution to the identified problem.

7. The system of claim 1 wherein receiving the query further comprise receiving a set of weights to be applied to respective ones of the plurality of data sources, and wherein running the query comprises assigning priorities to data in the big data resource received from the plurality of data sources in accordance with the received set of weights.

8. The system of claim 1 wherein the query is associated with at least one of a feature and a service offered by the enterprise system.

9. The system of claim 8 wherein the plurality of data sources comprise:
a first data source providing support data to the big data resource, the support data comprising information associated with requests for assistance with the at least one feature and service offered by the enterprise system;
a second data source providing survey data to the big data resource, the survey data comprising information from surveys associated with the at least one feature and service offered by the enterprise system;
a third data source providing beta program data to the big data resource, the beta program data comprising feedback information associated with one or more test programs for the at least one feature and service offered by the enterprise system; and
a fourth data source providing click count data to the big data resource, the click count data comprising click counts for one or more enterprise websites associated with the at least one feature and service offered by the enterprise system.

10. The system of claim 8 wherein initiating the action in the subset of the plurality of data sources to resolve the identified issue comprises modifying training of users of the enterprise system for the at least one feature and service offered by the enterprise system.

11. The system of claim 8 wherein initiating the action in the subset of the plurality of data sources to resolve the identified issue comprises modifying the least one feature and service offered by the enterprise system.

12. The system of claim 8 wherein initiating the action in the subset of the plurality of data sources to resolve the identified issue comprises modifying one or more technical writings and publications associated with the least one feature and service offered by the enterprise system.

13. A method comprising:
receiving, via a user interface from a user computing device, a query associated with an enterprise system;
running the query, utilizing structured data and unstructured data of a big data resource, to identify at least one issue associated with the enterprise system, the big data resource comprising data from a plurality of data sources coupled to the big data resource via at least one network;
providing, via the user interface to the user computing device, the identified issue;
receiving, via the user interface from the user computing device, feedback regarding the identified issue and a resolution to the identified issue;
matching at least one of one or more terms and one or more topics in the identified issue and the resolution to the identified issue with a portion of the data in the big data resource received from a subset of the plurality of data sources; and
initiating action in the subset of the plurality of data sources to resolve the identified issue;
wherein the method is performed by a distributed computing platform comprising a plurality of node clusters, a given one of the plurality of node clusters comprising a given set of resource elements dedicated for performance of a given task in the distributed computing platform;
wherein the user computing device is not configured with computing resources sufficient to run the query on an amount of data stored in the big data resource within a designated time period; and
wherein the plurality of node clusters of the distributed computing platform have sufficient computing resources to run the query on the amount of data stored in the big data resource within the designated time period.

14. The method of claim 13 wherein the plurality of data sources comprises one or more social media data sources, and wherein matching said at least one of the one or more terms and the one or more topics in the identified issue and the resolution to the identified issue with the portion of the data in the big data resource received from a subset of the plurality of data sources comprises identifying one or more users of the enterprise system posting comments to the one or more social media data sources indicating that the one or more users are affected by the identified issue.

15. The method of claim 14 wherein initiating the action in the subset of the plurality of data sources to resolve the identified issue comprises generating notifications via the one or more social media data sources to the one or more users of the enterprise system indicating the resolution to the identified problem.

16. The method of claim 13 wherein the query is associated with at least one of a feature and a service offered by the enterprise system, and wherein initiating the action in the subset of the plurality of data sources to resolve the identified issue comprises at least one of:
modifying training of users of the enterprise system for the at least one feature and service offered by the enterprise system;
modifying the least one feature and service offered by the enterprise system; and
modifying one or more technical writings and publications associated with the least one feature and service offered by the enterprise system.

17. A computer program product comprising a non-transitory processor-readable storage medium having encoded therein executable code of one or more software programs, wherein the one or more software programs when executed by a distributed computing platform cause the distributed computing platform:
to receive, via a user interface from a user computing device, a query associated with an enterprise system;
to run the query, utilizing structured data and unstructured data of a big data resource, to identify at least one issue associated with the enterprise system, the big data resource comprising data from a plurality of data sources coupled to the big data resource via at least one network;
to provide, via the user interface to the user computing device, the identified issue;
to receive, via the user interface from the user computing device, feedback regarding the identified issue and a resolution to the identified issue;
to match at least one of one or more terms and one or more topics in the identified issue and the resolution to the identified issue with a portion of the data in the big data resource received from a subset of the plurality of data sources; and
to initiate action in the subset of the plurality of data sources to resolve the identified issue;
wherein the distributed computing platform comprises a plurality of node clusters, a given one of the plurality of node clusters comprising a given set of resource elements dedicated for performance of a given task in the distributed computing platform;
wherein the user computing device is not configured with computing resources sufficient to run the query on an amount of data stored in the big data resource within a designated time period; and
wherein the plurality of node clusters of the distributed computing platform have sufficient computing resources to run the query on the amount of data stored in the big data resource within the designated time period.

18. The computer program product of claim 17 wherein the plurality of data sources comprises one or more social media data sources, and wherein matching said at least one of the one or more terms and the one or more topics in the identified issue and the resolution to the identified issue with the portion of the data in the big data resource received from a subset of the plurality of data sources comprises identifying one or more users of the enterprise system posting comments to the one or more social media data sources indicating that the one or more users are affected by the identified issue.

19. The computer program product of claim 17 wherein initiating the action in the subset of the plurality of data sources to resolve the identified issue comprises generating notifications via the one or more social media data sources to the one or more users of the enterprise system indicating the resolution to the identified problem.

20. The computer program product of claim 17 wherein the query is associated with at least one of a feature and a service offered by the enterprise system, and wherein initiating the action in the subset of the plurality of data sources to resolve the identified issue comprises at least one of:

modifying training of users of the enterprise system for the at least one feature and service offered by the enterprise system;

modifying the least one feature and service offered by the enterprise system; and modifying one or more technical writings and publications associated with the least one feature and service offered by the enterprise system.

\* \* \* \* \*